(12) United States Patent
Wang et al.

(10) Patent No.: US 11,899,149 B1
(45) Date of Patent: Feb. 13, 2024

(54) METHOD FOR AUTOMATICALLY IDENTIFYING ACTIVE SOURCE AZIMUTH OF PLANETARY SEISMOMETER

(71) Applicant: INSTITUTE OF GEOLOGY AND GEOPHYSICS, THE CHINESE ACADEMY OF SCIENCES, Beijing (CN)

(72) Inventors: Juan Wang, Beijing (CN); Qingyu You, Beijing (CN); Shengquan Zhang, Beijing (CN); Shaoqing Li, Beijing (CN); Jinhai Zhang, Beijing (CN)

(73) Assignee: INSTITUTE OF GEOLOGY AND GEOPHYSICS, THE CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 18/447,322

(22) Filed: Aug. 10, 2023

(30) Foreign Application Priority Data

Apr. 26, 2023 (CN) .......................... 202310458339.5

(51) Int. Cl.
*G01V 1/30* (2006.01)
*G01V 13/00* (2006.01)

(52) U.S. Cl.
CPC ............. *G01V 1/307* (2013.01); *G01V 13/00* (2013.01)

(58) Field of Classification Search
CPC ................................ G01V 1/307; G01V 13/00
See application file for complete search history.

(56) References Cited

FOREIGN PATENT DOCUMENTS

| CN | 103645490 A | | 3/2014 |
|---|---|---|---|
| CN | 105388515 A | | 3/2016 |
| CN | 108594291 A | | 9/2018 |
| CN | 212364597 U | | 1/2021 |
| CN | 115453149 A | * | 12/2022 |
| JP | 2015118065 | | 6/2015 |

OTHER PUBLICATIONS https://www.nasa.gov/missions/insight/nasas-insight-hears-its-first-meteoroid-impacts-on-mars/ Sep. 19, 2022 (Year: 2022).*
https://www.seis-insight.eu/fr/public/l-instrument-seis/accueil-instrument-seis Feb. 2, 2018 (Year: 2018).*
https://www.seis-insight.eu/fr/public/sismologie-planetaire/accueil-insight-seis Feb. 26, 2018 (Year: 2018).*

* cited by examiner

*Primary Examiner* — Daniel Pihulic

(57) ABSTRACT

A method for automatically identifying an active source azimuth of a planet seismometer, comprising: intercepting a three-channel original time sequence in a duration before and after an active source first arrival signal of each support leg received by a planet seismometer in turn; converting the three-channel original time sequence to a horizontal plane based on a pitch angle and a roll angle of the planet seismometer after being deployed to a surface of a planet; converting a time sequence of the horizontal plane to RTZ coordinates and calculating the maximum amplitudes of components of a vibration signal; constructing a target function based on the maximum amplitudes of components of a vibration signal, and scanning an azimuth of the planet seismometer at preset angle intervals, wherein when the target function reaches the minimum, the corresponding azimuth of the planet seismometer is the optimal estimation.

5 Claims, 4 Drawing Sheets

US 11,899,149 B1

METHOD FOR AUTOMATICALLY IDENTIFYING ACTIVE SOURCE AZIMUTH OF PLANETARY SEISMOMETER

CROSS REFERENCE TO RELATED APPLICATIONS

The present application claims priority of a Chinese patent application submitted to State Intellectual Property Office of China on Apr. 26, 2023, with an application No. 202310458339.5; the entire content of which is incorporated in the present disclosure by reference.

TECHNICAL FIELD

The present invention relates to the technical field of planet detection, more specifically to a method for automatically identifying an active source azimuth of a planet seismometer.

BACKGROUND

Deployment of planetary seismometers is the most effective means to detect internal structures of planets and underground resources of planets. The deployment of planetary seismometer is divided into two types: unmanned deployment and manned deployment. Among them, unmanned deployment will face the difficulty that an azimuth cannot be self-perceived after deployment, and it is necessary to try to obtain an azimuth of an instrument itself to obtain accurate positioning and application of planetary seismic signals. Therefore, how to realize azimuth perception of planetary seismometers is crucial. In addition, a planetary seismometer deployed by someone can measure an azimuth of an instrument on the spot with professional equipment by astronauts. However, no matter what kind of deployment mode, it will face attitude changes of an instrument caused by vibration, disturbance, uneven settlement, and so on after the instrument is deployed. These changes need a method to be able to sense in time, so as to ensure accuracy and application effect of observation data of planetary seismometers.

In the prior art, orientation perception of planetary seismometers is still blank, and there is no automatic recognition algorithm. Azimuth recognition methods for seismometers include ways of field survey, a natural source P-wave polarity analysis method, a waveform simulation comparison method, a noise cross-correlation method, etc., but there is no method for automatically identifying an azimuth using an exoplanet seismometer active source method.

Therefore, how to provide a method for automatically identifying an active source azimuth of a planet seismometer is a problem that urgently needs to be solved by technicians in this field.

SUMMARY OF THE DISCLOSURE

In view of this, the present invention provides a method for automatically identifying an active source azimuth of a planet seismometer, which can realize automatic identification of an azimuth of a planet seismometer without requiring manual intervention.

In order to achieve the above purpose, the present invention adopts the following technical solutions.

A method for automatically identifying an active source azimuth of a planet seismometer comprising:

intercepting a three-channel original time sequence in a duration $\delta t$ before and a duration $\delta t$ after an active source first arrival signal of every one from the first lander support leg to the N-th lander support leg received by a planet seismometer in turn;

converting the three-channel original time sequence to a horizontal plane based on a pitch angle $\theta 1$ and a roll angle $\theta 2$ of the planet seismometer after being deployed to a surface of a planet;

converting a time sequence of the horizontal plane to RTZ coordinates and calculating the maximum amplitudes of components of a vibration signal in the R direction and in the T direction;

constructing a target function A based on the maximum amplitudes of components of a vibration signal in the R direction and in the T direction, and scanning an azimuth $\varphi$ of the planet seismometer at preset angle intervals in a range of 0~360°, and identifying anazimuth $\varphi$ of the planet seismometer corresponding to the minimum of the target function A as the optimal estimation for azimuth.

Preferably, a specific calculation formula for the converting the three-channel original time sequence to a horizontal plane based on a pitch angle $\theta 1$ and a roll angle $\theta 2$ of the planet seismometer after being deployed to a surface of a planet is:

$$xhi = xi^* \cos \theta 1$$

$$yhi = yi^* \cos \theta 2$$

Among them, xi is a time sequence of the planet seismometer intercepted in the NS direction; yi is a time sequence of the planet seismometer intercepted in the EW direction; i=1, 2, ... N, N represents the number of the lander support legs; xhi represents a component of the time sequence xi of the planet seismometer intercepted in the NS direction on a planet horizontal plane; yhi represents a component of the time sequence yi of the planet seismometer intercepted in the EW direction on the planet horizontal plane.

Preferably, a calculation formula for the maximum amplitudes of components of a vibration signal in the R direction and in the T direction is:

$$Ari = \max(|xhi^* \cos \theta ai + yhi^* \sin \theta ai|)$$

$$Ati = \max(|xhi^* \sin \theta ai + yhi^* \cos \theta ai|)$$

Among them, $\theta ai$ is an included angle between a direction of the i-th lander support leg and the N direction of the planet seismometer; Ari and Ati respectively represent the maximum amplitudes of components of a vibration signal in the R direction and in the T direction; i=1, 2, ... N, N represents the number of the lander support legs.

Preferably, a calculation formula for the target function A is:

$$A = \frac{At1}{Ar1} + \frac{At2}{Ar2} + \frac{At3}{Ar3} + \ldots + \frac{AtN}{ArN}$$

Among them, i=1, 2, ... N, N represents the number of the lander support legs.

A calculation formula for the azimuth $\varphi$ of the planet seismometer is:

$$\varphi = \theta ci - \theta ai$$

Among them, i=1, 2, . . . N, N represents the number of the lander support legs; the earthquake source incident azimuth θai is an included angle between a direction of the i-th lander support leg and the N direction of the planet seismometer; θci represents an azimuth of a ground contact point of the i-th lander support leg.

Optionally, the method further comprises: mounting fixed vibration excitation devices at the same height of multiple support legs of a lander; turning on and off each vibration excitation device sequentially by a controller of the lander to generate vibration signals; transmitting the vibration signals from the support legs to the surface of the planet, and then to the interior of the planetary seismometer; and perceiving the vibration signals by the planetary seismometer.

The present invention has the following effect:
1. By the active source method, detection data with a higher signal-to-noise ratio and a higher sensitivity than that of the noise cross correlation method can be obtained. The calculated azimuth is smaller in error and more reliable in result.
2. By the active source method, it is not necessary to wait for a natural planetary seismic signal, and an azimuth of a planetary seismometer can be obtained automatically, quickly and efficiently, thus it is possible to provide a basis for subsequent analysis and processing of the natural planetary seismic signal.
3. The present invention provides a new way for in-orbit calibration of planetary seismometer on the lunar surface or on the Martian ground. Through vibration signals generated regularly by support legs of a lander, a basis for judging whether working is normal is provided to a planetary seismometer, and long-term operating performance parameters thereof can be calibrated regularly and actively.

BRIEF DESCRIPTION OF THE DRAWINGS

In order to describe technical solutions in embodiments of the present invention or in the prior art more clearly, drawings required being used in description of the embodiments or of the prior art will be simply introduced below. Obviously, the drawings in the following description are only embodiments of the present invention; for one of ordinary skill in the art, it is also possible to acquire other drawings according to the provided drawings on the premise of paying no creative work.

Regarding FIG. 1, the figure is a flowchart of a method for automatically identifying an active source azimuth of a planet seismometer provided by the present invention.

Figure 2:
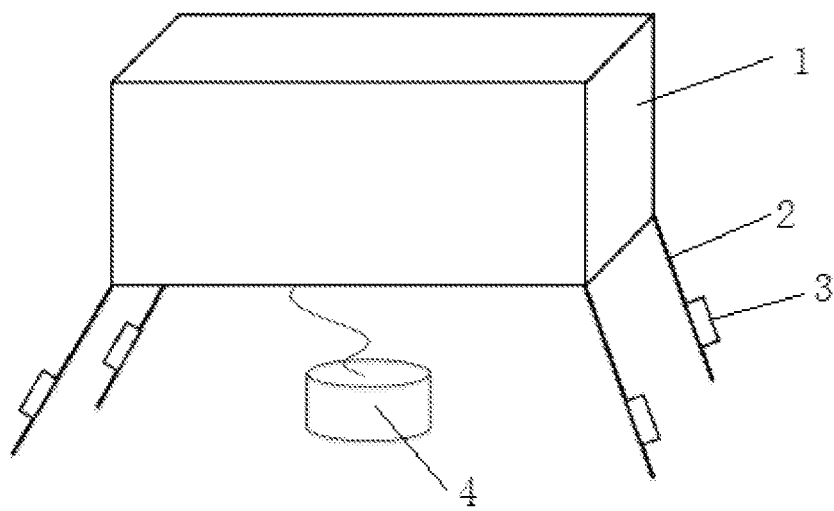

Regarding FIG. 2, the figure is a schematic view of a relative position relationship between a planet seismometer and a lander, which are arranged on a surface of a planet, provided by the present invention.

Figure 3:
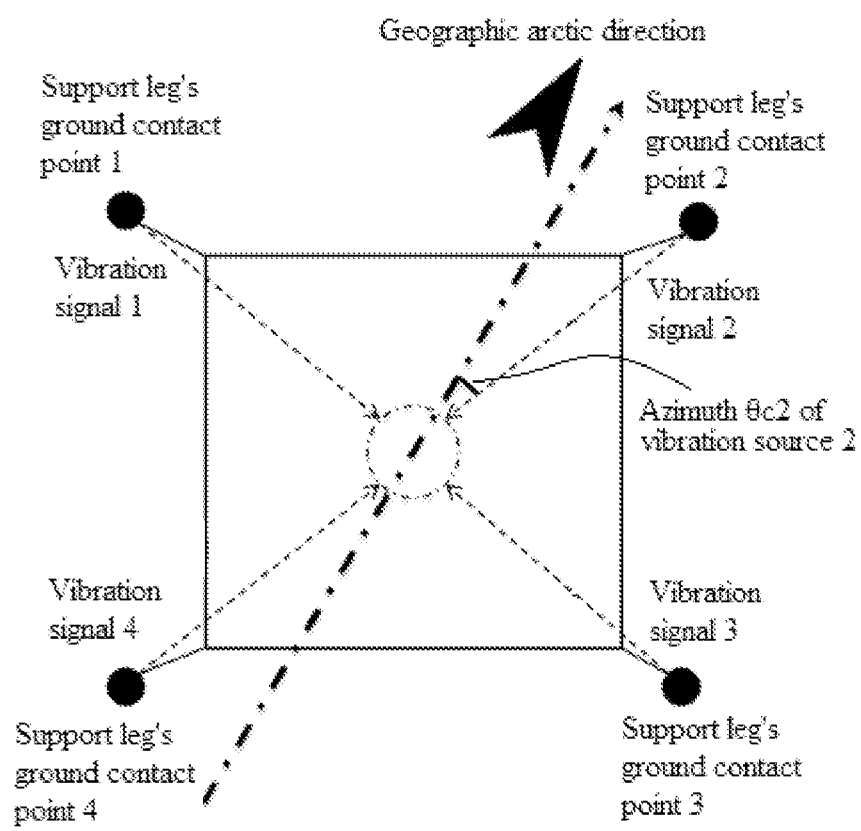

Regarding FIG. 3, the figure is a top view of the planet seismometer and the lander, which are arranged on the surface of the planet, provided by the present invention.

Figure 4:
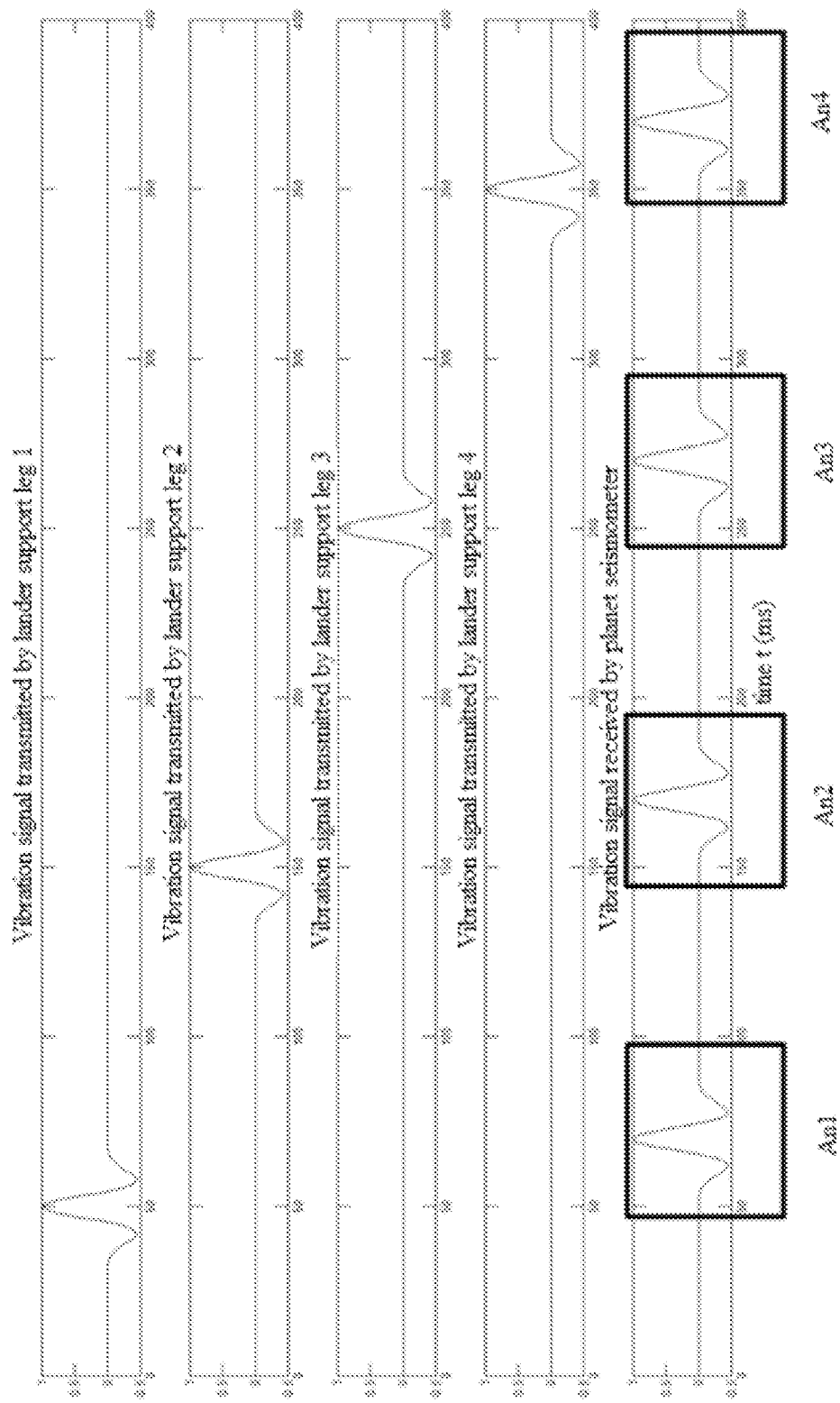

Regarding FIG. 4, the figure is a transmitted waveform diagram of a vibration excitation device and a received waveform diagram of a planet seismometer provided by the present invention.

Figure 5:
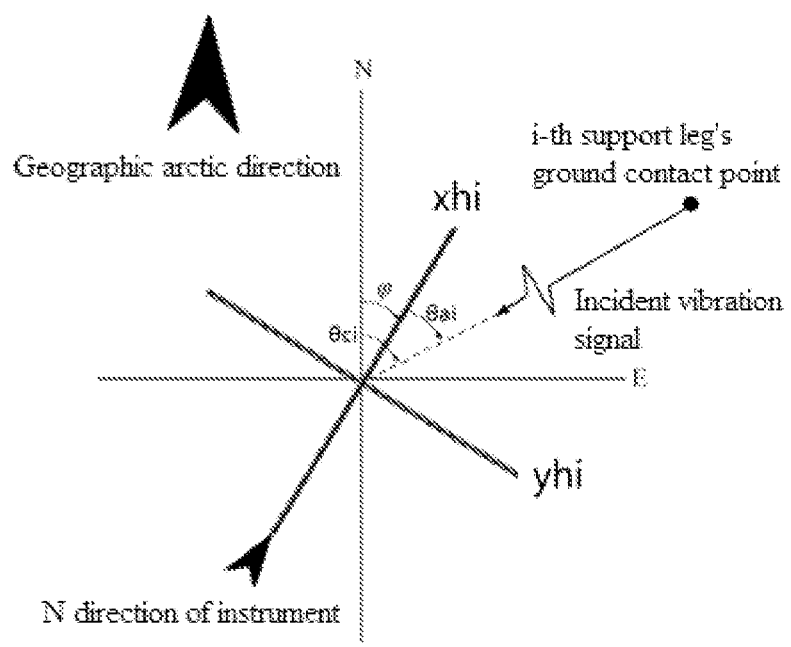

Regarding FIG. 5, the figure is a schematic diagram of transmission of a vibration signal of an active source provided by the present invention.

Among them: 1-lander; 2-support leg; 3-vibration excitation device; 4-planet seismometer.

DETAILED DESCRIPTION

The technical solutions in the embodiments of the present invention will be described clearly and completely below in combination with the drawings in the embodiments of the present invention. Obviously, the described embodiments are merely some embodiments of the present invention, rather than all embodiments. Based on the embodiments of the present invention, any other embodiment obtained by one of ordinary skill in the art on the premise of paying no creative work should belong to the protection scope of the present invention.

Figure 1:
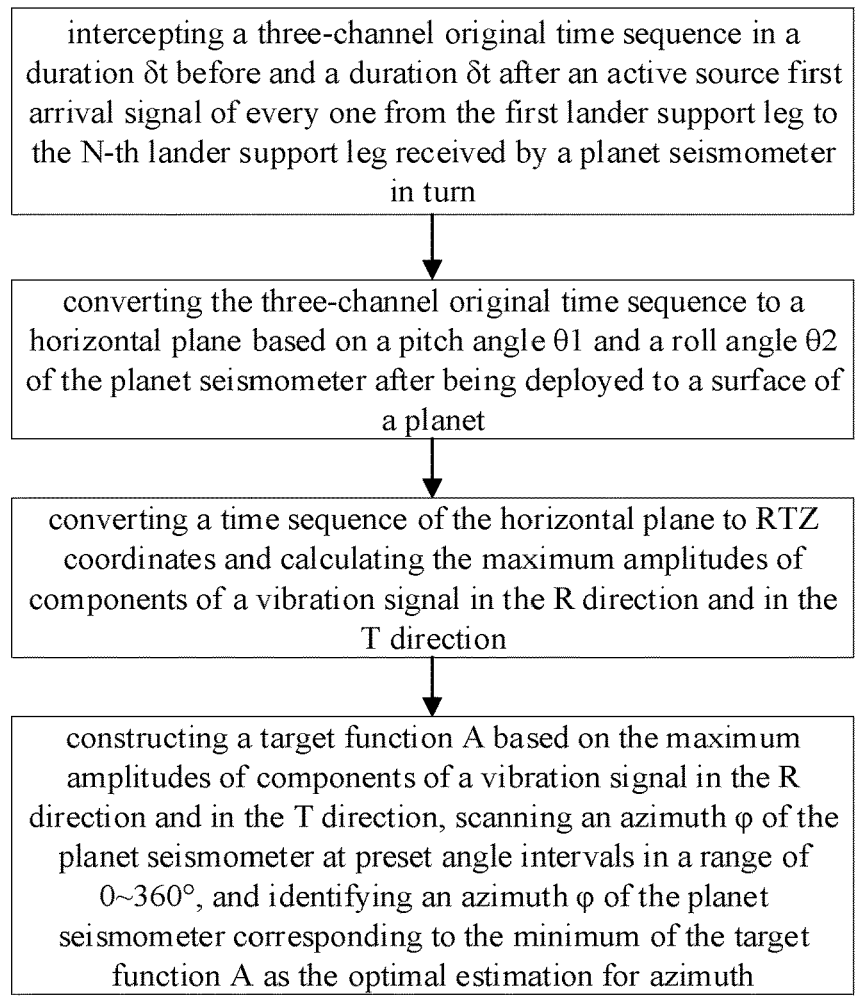

An embodiment of the present invention discloses a method for automatically identifying an active source azimuth of a planet seismometer, as shown in FIG. 1, comprising:
- intercepting a three-channel original time sequence in a duration δt before and a duration δt after an active source first arrival signal of every one from the first lander support leg to the N-th lander support leg received by a planet seismometer in turn;
- converting the three-channel original time sequence to a horizontal plane based on a pitch angle θ1 and a roll angle θ2 of the planet seismometer after being deployed to a surface of a planet;
- converting a time sequence of the horizontal plane to RTZ coordinates and calculating the maximum amplitudes of components of a vibration signal in the R direction and in the T direction;
- constructing a target function A based on the maximum amplitudes of components of a vibration signal in the R direction and in the T direction, and scanning an azimuth φ of the planet seismometer at preset angle intervals in a range of 0~360°, and identifying an azimuth φ of the planet seismometer corresponding to the minimum of the target function A as the optimal estimation for azimuth.

As shown in FIG. 2, in the present invention, fixed vibration excitation devices 3 are mounted at the same height of multiple support legs 2 of a lander 1; each vibration excitation device 3 is turned on and off sequentially by a controller of the lander 1; vibration signals will be transmitted from the support legs 2 to a surface of a planet, and then transmitted to the interior of a planetary seismometer 4 and perceived by the planetary seismometer 4. The device can be regularly turned on or randomly turned on according to actual needs, so as to realize perception and calibration of orientation of the planetary seismometer. It should be noted that there is no limit to the number of the support legs of the lander, as shown in FIG. 2, this embodiment takes a lander with four support legs as an example.

As shown in FIG. 3, when the first vibration excitation device 3 works, because vibration propagates towards the ground along the legs of the lander 1 and reaches the planet seismometer 4 with the shortest distance, it will be first perceived by the planet seismometer 4. Although the vibration source will also propagate along lander 1 to other lander legs and be observed by the planetary seismometer 4 through the ground, its vibration will arrive later than that of the lander leg directly equipped with vibration excitation. Therefore, a polarization direction of initial arrival vibration recorded by the planetary seismometer 4 is mainly related to an orientation of a support leg of the lander excited by the current vibration, so that a collected vibration signal of the first lander leg can be obtained by calculation. By analogy, the planetary seismometer 4 can acquire vibration signals of each lander leg respectively.

In this embodiment, specific steps of intercepting a three-channel original time sequence in a duration δt before and after an active source first arrival signal of the first lander support leg to the N-th lander support leg received by a planet seismometer in turn are as follows.

Based on frequencies and duration characteristics of transmitted vibration signals and received signals, a three-channel original time sequence in a duration δt before and after an active source first arrival signal of the first lander support leg received by a planet seismometer is intercepted and record as An1={x1, y1, z1}. As shown in FIG. 4, among them, intercepted time sequence in the NS direction of the planet seismometer is x1, intercepted time sequence in the EW direction is y1, and intercepted time sequence in the vertical direction is z1. Assuming that the lander has N support legs, interception record data of active source vibration signals of the second, the third, . . . to the N-th support leg is recorded as An2, An3, . . . , AnN, interception record data of active source vibration signals of the i-th support leg is recorded as Ani={xi, yi, zi}, wherein i=1, 2, . . . N, N represents the number of the support legs of the lander.

In this embodiment, the converting the three-channel original time sequence to a horizontal plane based on a pitch angle θ1 and a roll angle θ2 of the planet seismometer after being deployed to a surface of a planet specifically includes that:

by an attitude sensor in the planet seismometer, its pitch angle θ1 and roll angle θ2 after being deployed to a surface of a planet are obtained; with respect to the interception record data Ani={xi, yi, zi}, wherein i=1, 2, . . . N, the three-channel original time sequence xi, yi, zi is converted to a horizontal plane according to the following formula and recorded as xhi, yhi, zhi:

$xhi = xi * \cos θ1$ $yhi = yi * \cos θ2$ $zhi = \sqrt{0.1 zi^2 + (xi * \sin θ1)^2 + (yi * \sin θ2)^2}$ by the above steps, the three-channel original time sequences corresponding to the first lander support leg to the N-th lander support leg are respectively converted to a horizontal plane.

In this embodiment, the converting a time sequence of the horizontal plane to RTZ coordinates and calculating the maximum amplitudes of components of a vibration signal in the R direction and in the T direction specifically includes that:

the time sequences xhi and yhi in the horizontal plane, wherein i=1, 2, . . . N, are converted to RTZ coordinates according to the following formula, with an earthquake source incident azimuth Dai, wherein Dai is defined as an included angle between a direction of the i-th lander support leg (a direction of the earthquake source) and the N direction of the planet seismometer; and the maximum amplitude thereof is calculated.

the RTZ coordinate system is defined as follows: the R direction is defined as a direction from a ground contact point of a support leg generating an excitation signal to the planet seismometer along a path of the planet's great circle, the Z direction is upward and perpendicular to the horizontal plane, and the T direction is perpendicular to the plane defined by the R and Z directions. The maximum amplitude of the component of the vibration signal in the R direction is record as Ari, and the maximum amplitude of the component of the vibration signal in the T direction is record as Ati:

$Ari = \max(|xhi * \cos θai + yhi * \sin θai|)$ $Ati = \max(|xhi * \sin θai + yhi * \cos θai|)$ by the above steps, the maximum amplitude of a component in the R direction and the maximum amplitude of a component in the T direction of a vibration signal corresponding to the first lander support leg to the N-th lander support leg are obtained.

In this embodiment, the target function A is:

$$A = \frac{At1}{Ar1} + \frac{At2}{Ar2} + \frac{At3}{Ar3} + \ldots + \frac{AtN}{ArN}$$

As shown in FIG. 5, the azimuth of the planet seismometer can be expressed as φ=θci-θai, wherein i=1, 2, . . . N, and the earthquake source incident azimuth θai is the included angle between the direction of the i-th lander support leg and the N direction of the planet seismomoter. Moreover, θci is the azimuth of known i-th support leg's ground contact point and can be obtained by calculation based on the azimuth of the lander, the size distribution of the support legs thereof, and the deployed position of the planet seismometer.

In a range of 0~360°, φ is scanned at intervals of 1° (or less); when the value of A reaches the minimum, the corresponding absoluteazimuth φ of the planet seismometer is the optimal estimation, and automatic perception for the azimuth of the planet seismometer is finally realized.

Various embodiments in this specification are described in a progressive manner, and each embodiment focuses on differences from other embodiments. The same and similar parts of various embodiment can be referred to each other. For the device disclosed in the embodiments, due to its correspondence with the method disclosed in the embodiments, the description is relatively simple. Please refer to description of the method part for relevant details.

The above description of the disclosed embodiments enables professionals in the art to implement or use the present invention. Various modifications to these embodiments will be apparent to professionals in the art, and the general principles defined herein can be implemented in other embodiments without departing from the spirit or scope of the present invention. Therefore, the present invention will not be limited to these embodiments shown herein, but will meet the widest range being consistent with the principles and novel features disclosed herein.

What is claimed is:

1. A method for automatically identifying an active source azimuth of a planet seismometer comprising:
receiving, by the planet seismometer, vibration signals of N support legs of a lander, wherein the vibration signal of each support leg comprises an active source first arrival signal; and intercepting a three-channel original time sequence in a duration δt before and a duration δt after the active source first arrival signal of every one from the first support leg in the N support legs to the N-th support leg in the N support legs received by the planet seismometer in turn;
converting the three-channel original time sequence to a horizontal plane based on a pitch angle θ1 and a roll angle θ2 of the planet seismometer after being deployed to a surface of a planet;
converting a time sequence of the horizontal plane to RTZ coordinates and calculating the maximum amplitudes of components of a vibration signal in the R direction and in the T direction;
constructing a target function A based on the maximum amplitudes of components of a vibration signal in the R direction and in the T direction, scanning an azimuth φ of the planet seismometer at preset angle intervals in a range of 0~360°, and identifying an azimuth φ of the planet seismometer corresponding to the minimum of the target function A as the optimal estimation for azimuth.

2. The method for automatically identifying an active source azimuth of a planet seismometer according to claim 1, wherein a specific calculation formula for the converting the three-channel original time sequence to a horizontal plane based on a pitch angle θ1 and a roll angle θ2 of the planet seismometer after being deployed to a surface of a planet is:

$xhi = xi * \cos θ1$ $yhi = yi * \cos θ2$ wherein xi is a time sequence of the planet seismometer intercepted in the NS direction; yi is a time sequence of the planet seismometer intercepted in the EW direction; i=1, 2, . . . N, N represents the number of the lander support legs; xhi represents a component of the time sequence xi of the planet seismometer intercepted in the NS direction on a planet horizontal plane; yhi represents a component of the time sequence yi of the planet seismometer intercepted in the EW direction on the planet horizontal plane.

3. The method for automatically identifying an active source azimuth of a planet seismometer according to claim 2, wherein a calculation formula for the maximum amplitudes of components of a vibration signal in the R direction and in the T direction is:

$Ari = \max(|xhi * \cos θai + yhi * \sin θai|)$ $Ati = \max(|xhi * \sin θai + yhi * \cos θai|)$ wherein θai is an included angle between a direction of the i-th lander support leg and the N direction of the planet seismometer; Ari and Ati respectively represent the maximum amplitudes of components of a vibration signal in the R direction and in the T direction; i=1, 2, . . . N, N represents the number of the lander support legs.

4. The method for automatically identifying an active source azimuth of a planet seismometer according to claim 3, wherein a calculation formula for the target function A is:

$$A = \frac{At1}{Ar1} + \frac{At2}{Ar2} + \frac{At3}{Ar3} + \ldots + \frac{AtN}{ArN}$$

wherein i=1, 2, . . . N, N represents the number of the lander support legs;

a calculation formula for the azimuth φ of the planet seismometer is:

$φ = θci - θai$ wherein i=1, 2, . . . N, N represents the number of the lander support legs; the earthquake source incident azimuth θai is an included angle between a direction of the i-th lander support leg and a North direction of the planet seismometer; θci represents an azimuth of a ground contact point of the i-th lander support leg.

5. The method for automatically identifying an active source azimuth of a planet seismometer according to claim 1, further comprising: mounting fixed vibration excitation devices at the same height of multiple support legs of the lander; turning on and off each vibration excitation device sequentially by a controller of the lander to generate vibration signals; transmitting the vibration signals from the support legs to the surface of the planet, and then to the interior of the planet seismometer; and perceiving the vibration signals by the planet seismometer.

* * * * *